(12) United States Patent
Carabelli (10) Patent No.: US 10,878,205 B2
(45) Date of Patent: Dec. 29, 2020

(54) MAGNETIC STRIPE READER, METHOD FOR DETERMINING THE STRIPE TRAVEL SPEED, METHOD FOR RECOGNIZING DATA RECORDED ON THE STRIPE AND CORRESPONDING DEVICES

(71) Applicant: INGENICO GROUP, Paris (FR)

(72) Inventor: Andre Carabelli, Saint-Peray (FR)

(73) Assignee: INGENICO GROUP, Paris (FR)

( * ) Notice: Subject to any disclaimer, the term of this patent is extended or adjusted under 35 U.S.C. 154(b) by 54 days.

(21) Appl. No.: 16/267,855

(22) Filed: Feb. 5, 2019

(65) Prior Publication Data
US 2019/0243992 A1 Aug. 8, 2019

(30) Foreign Application Priority Data
Feb. 6, 2018 (FR) ...................................... 18 50976

(51) Int. Cl.
*G06K 7/08* (2006.01)
(52) U.S. Cl.
CPC ............. *G06K 7/087* (2013.01); *G06K 7/084* (2013.01)
(58) Field of Classification Search
CPC ................................ G06K 7/087; G06K 7/084
USPC ................................................. 235/449, 379
See application file for complete search history.

(56) References Cited

U.S. PATENT DOCUMENTS

| 4,777,540 A * | 10/1988 | McCoy | G06K 7/084 340/686.2 |
| 5,308,959 A * | 5/1994 | Cherry | G06K 7/084 235/379 |
| 2004/0173679 A1* | 9/2004 | Oki | G06K 7/084 235/449 |
| 2009/0243606 A1* | 10/2009 | Riedmuller | G01D 5/145 324/244 |

FOREIGN PATENT DOCUMENTS

| CN | 103576101 A | 2/2014 |
| EP | 0053655 A2 | 6/1982 |
| GB | 2015794 A | 9/1979 |
| JP | 2015200551 A | 11/2015 |

OTHER PUBLICATIONS

French Search Report and Written Opinion dated Dec. 12, 2018 for corresponding French Application No. 1850976, filed Feb. 6, 2018.
English translation of the Written Opinion dated Dec. 12, 2018 for corresponding French Application No. 1850976, filed Feb. 6, 2018.

* cited by examiner

*Primary Examiner* — Karl D Frech
(74) *Attorney, Agent, or Firm* — David D. Brush; Westman, Champlin & Koehler, P.A.

(57) ABSTRACT

A magnetic stripe reader includes at least one first sensor and one second sensor respectively delivering a first temporal signal and a second temporal signal proportional to a flux of a magnetic field of the magnetic stripe traveling before the first and second sensors during reading of the stripe by the reader. The first and second sensors are disposed at a pre-determined distance from each other in a sense of travel of the stripe during the reading.

14 Claims, 4 Drawing Sheets

MAGNETIC STRIPE READER, METHOD FOR DETERMINING THE STRIPE TRAVEL SPEED, METHOD FOR RECOGNIZING DATA RECORDED ON THE STRIPE AND CORRESPONDING DEVICES

1 FIELD OF THE INVENTION

The field of the invention is that of magnetic stripe readers.

The invention relates more particularly to such a reader and to associated methods making it possible to overcome ergonomical constraints related to the kinematics of passage of the magnetic stripe along the reader during the reading of the stripe in question.

The invention has numerous applications, especially but not exclusively in the field of electronic payment terminals configured to read magnetic payment cards but also in the field of transport ticket or fare readers (for example bus or underground rail fare readers), readers for access cards to buildings etc.

2 TECHNOLOGICAL BACKGROUND

Magnetic stripes are conventionally read by using a sensor sensitive to variations in the magnetic field flux that passes through them, i.e. at dΦ/dt, with Φ=H*S, S being the sensitive surface of the sensor and H being the component of the magnetic field orthogonal to the surface in question. Such a prior-art sensor is constituted by a magnetic circuit exciting a coil. The flux is picked up by a gap on which the magnetic stripe to be read is placed flat. The coil can be considered to be an electrical generator sensitive to variations of the magnetic flux. Thus, the travel or passing of the magnetic stripe before the gap induces flux variations in the magnetic circuit.

However, such known readers have several drawbacks.

More particularly, in order to be able to put the variations of the temporal signal coming from such a sensor in correspondence with the spatial disposition of the information recorded along the magnetic stripe, this stripe must be moved with a sufficiently constant speed before the sensor in question. Besides, a minimum speed of movement is required in order to obtain field variations sufficient for accurate processing by the embedded electronic circuit.

Thus, the user must show dexterity in order to make the magnetic stripe travel with sufficient regularity in the reader. It is for example impossible to read the stripe if the user stops or makes a backward movement.

Besides, the mechanisms that enables a reading head comprising the sensor to be placed flat and guided on the magnetic stripe should not cause jerky movements (microtranslations, oscillations, etc.) liable to induce local variations in the speed of passage. This leads to additional constraints of manufacture for magnetic stripe readers.

There is thus a need for a magnetic stripe reading solution that overcomes the ergonomical constraints related to the kinematics of passage of the magnetic stripe along the reader.

3 SUMMARY

One embodiment of the invention proposes a magnetic stripe reader. Such a reader comprises at least one first sensor and one second sensors respectively delivering a first temporal signal and a second temporal signal proportional to a flux of a magnetic field of the magnetic stripe traveling or passing before the first and second sensors during the reading of the stripe by the reader. The first and second sensors are disposed at a pre-determined distance from each other in a sense of travel of the stripe during the reading.

Thus, the invention proposes a novel and inventive solution for a magnetic stripe reader that overcomes the ergonomical constraints related to the kinematics of passage of the magnetic stripe in the reader.

To this end, the invention proposes to use at least two sensors sensitive to the flux of the magnetic stream passing through them instead of a single sensor sensitive to the derivative of the flux in question as in known readers.

The stripe passage speed or stripe travel speed can thus be easily determined and the pieces of data recorded on the stripe in question can be recognized through the application of corresponding methods described here below. This effect is obtained whatever the kinematics of the stripe when it is being read, for example when the stripe changes its sense of travel during the reading operation or in the presence of stops and restarts of travel or even in the event of travel at a very low speed etc.

In one embodiment, the first and second sensors belong to the group comprising:
 a TMR (Tunneling Magnetic Resistance) sensor; and
 a GMR (Giant Magnetic Resistance) sensor.

Thus, the implementing of the stripe reader is based on the use of commercially available sensors giving a simple, robust and economical solution.

In one embodiment, the first and second sensors are integrated into one and the same silicon chip.

Thus, the dispersions between the characteristics (static or deviant for example in terms of temperature) of the first and second sensors are mastered and minimized (for example their levels of sensitivity to the magnetic field). As a result, it is possible to do away with phases of calibration of the sensors to compensate for the dispersions in question, thereby reducing the cost of the overall solution.

Besides, the distance d between the sensors is particularly well controlled, thereby improving the results obtained during the implementing of methods according to the invention described here below.

In another embodiment of the invention, a method is proposed for determining the instantaneous speed of travel of a magnetic stripe read by a magnetic stripe reader according to the invention (according to any one of the embodiments described here above). Such a method for determining the instantaneous speed comprises a step for determining the instantaneous speed of travel of the magnetic stripe from the first and second temporal signals and from the pre-determined distance between the first and second sensors.

Thus, the invention also relates to a method for determining the instantaneous speed of travel of a magnetic stripe read by a reader as described here above (according to any one of the above-mentioned embodiments).

Thus, the nature of the signals delivered by the sensors of the reader (sensors sensitive to the flux of the magnetic field passing through them) enables the implementation of processing operations leading to determining the instantaneous speed in question in an improved way, i.e. regardless of the kinematics of the stripe during its reading.

Such an instantaneous speed determined in an improved way makes it possible for example to implement an improved recognition of data recorded on the stripe as described here below.

In one embodiment, the step for determining the instantaneous speed of travel comprises:

a sampling of the first and second temporal signals respectively delivering first and second temporal sequences of samples and, for at least one sample of the first temporal sequence of samples, called a current sample:

a determining of a corresponding sample of the second temporal sequence of samples, maximizing a pre-determined criterion of correspondence with the current sample; and an obtaining of a temporal distance between the current sample and the corresponding sample.

The instantaneous speed of travel is determined as a function of the temporal distance between the current sample and the corresponding sample and of the pre-determined distance d. The instantaneous speed of travel is associated with the current sample and with the corresponding sample.

Thus, the instantaneous travelling speed of the stripe is determined in a simple and robust manner for example through the ratio of the pre-determined distance d to the temporal distance between the current sample and the corresponding sample.

In one embodiment, the step for determining the corresponding sample comprises a correlation between the first and second temporal sequences of samples, delivering a correlation function. A temporal index of the corresponding sample is a function of an index of a maximum of the correlation function. The step for obtaining the temporal distance comprises a computation of a difference between the temporal indices of the current sample and of the corresponding sample.

Thus, the temporal distance between corresponding samples of the first and second sequences is determined in a simple and robust manner.

In one embodiment, a sign of the difference between the temporal indices of the current sample and the corresponding sample represents a sense of travel of the stripe relative to the reader at the time of the capture of the current sample by the first sensor.

In one embodiment, the step for determining the corresponding sample comprises an iterative computation of a plurality of areas as a function of a difference between:

a first sum on a temporal window comprising the current sample, of first samples of the first temporal sequence of samples; and a second sum, on the temporal window, of second samples of the second temporal sequence of samples offset by a variable temporal offset updated at each iteration of the computation.

A temporal index of the corresponding sample is a function of a value of the temporal offset corresponding to a minimum area among the plurality of areas. The step for obtaining the temporal distance comprises a computation of a difference between the temporal index of the current sample and the temporal index of the corresponding sample.

Thus, the temporal distance between corresponding samples of the first and second sequences is determined in a simple and robust manner.

In one embodiment, the sign of an area corresponding to a zero value of the temporal offset among the plurality of areas represents a sense of travel of the stripe relative to the reader at the time of capture of the current sample by the first sensor.

The invention also relates to a method for recognizing at least one piece of data recorded on a magnetic stripe read by a reader as described here above (according to any one of the above-mentioned embodiments). Such a method comprises the following steps:

determining the instantaneous speed of travel of the stripe by implementing the method for determining the instantaneous speed described here above (according to any one of its embodiments); and recognizing said at least one piece of data from the instantaneous speed of travel and from at least one of the first and second temporal sequences of samples.

More particularly, such a method of recognition uses the instantaneous speed of travel of the stripe determined by the method for determining described here above (according to any one of its embodiments).

Thus, the processing operations applied to the signals delivered by the sensors of the reader (sensors sensitive to the flux of the magnetic field passing through them) enable the recognition of the data in question whatever the kinematics of the stripe during the reading (e.g. even when the stripe changes its sense of travel during the reading or in the presence of stops and re-starts of travel or even in case of travel at a very low speed etc.).

In one embodiment, the step of recognition comprises a normalization of at least one of the first and second temporal sequences of samples from speeds associated with the samples of the sequences. The normalization delivers at least one sequence of virtual samples representing a spatial disposition of magnetic elements representing the at least one piece of data on the stripe. The at least one piece of data is recognized from the at least one sequence of virtual samples.

In one embodiment, the magnetic elements correspond to a plurality of magnetic strips disposed in a sense crosswise to the sense of travel of the stripe during the reading. The magnetic strips succeed one another along the stripe with magnetic polarities alternating from one strip to the next. The at least one piece of data is represented via a width of at least one corresponding magnetic strip. The step of recognition comprises a determining of the least one width. The at least one piece of data is recognized from the at least one width.

Thus, the recognition of data as encoded for example on the magnetic stripe of a payment card is done in a simple and robust manner.

In one embodiment, the step for determining the at least one width implements a method for estimating boundaries of the at least one corresponding magnetic strip, belonging to the group comprising:

a computation of a derivative function of the at least one sequence of virtual samples, the boundaries corresponding to zeros or to extrema of the derivative function; and a computation of a difference between the first and second sequences of virtual samples, the boundaries corresponding to zeros or to extrema of the difference, when the step of normalization applied to the first and second temporal sequences of samples delivers first and second corresponding sequences of virtual samples.

Thus, when the first and second sensors are implemented so as to be sensitive to the component of the magnetic field that is perpendicular to the magnetic stripe during the reading of the card, the boundaries of the strips correspond to the zeros of the derived function or to the zeros of the difference in question. On the contrary, when the first and second sensors are implemented so as to be sensitive to the component of the magnetic field that is coplanar to the magnetic stripe during the reading of the card, the boundaries of the strips correspond to the extrema of the derived function or to the extrema of the difference in question.

In one embodiment, the at least one piece of data is encoded according to an encoding known as the "F2F"

(Frequency/Double Frequency) encoding or the "Aiken Biphase" encoding as defined in the ISO/IEC-7811 standard.

The invention also relates to at least one computer program comprising program code instructions for the implementing of at least one method as described here above according to any one of its different embodiments when it is executed on a computer.

In another embodiment of the invention, a device is proposed for determining the instantaneous speed of travel of a magnetic stripe read by a reader as described here above (according to any one of the above-mentioned embodiments).

Such a device for determining the instantaneous speed of travel of a magnetic stripe is especially capable of implementing the method for determining the instantaneous speed of travel according to the invention (according to any one of the different embodiments mentioned here above).

Thus, the characteristics and advantages of this device are the same as those of the method for determining described here above. They are therefore not described in more ample detail.

Another embodiment of the invention proposes a device for the recognition of at least one piece of data recorded on a magnetic stripe read by a reader according to the invention (according to any one of the above-mentioned embodiments).

Such a device for recognizing at least one piece of recorded data on a magnetic stripe is especially capable of implementing the method of recognition of at least one piece of data according to the invention (according to any one of the different embodiments mentioned here above).

Thus, the characteristics and advantages of this device are the same as those of the method of recognition described here above. They are therefore not described in more ample detail.

Another embodiment of the invention proposes an electronic payment terminal comprising a reader according to the invention (according to any one of the different embodiments mentioned here above) and:
a device for determining the instantaneous speed according to the invention (according to any one of the different embodiments mentioned here above); and/or
a device for recognizing data according to the invention (according to any one of the different embodiments mentioned here above).

Thus, the characteristics and advantages of this terminal are the same as those of the devices described here above. They are therefore not described in more ample detail.

4 LIST OF FIGURES

Other features and advantages of the invention shall appear from the following description, given by way of an indicatory and non-exhaustive example, and from the appended drawings, of which.

5 DETAILED DESCRIPTION OF THE INVENTION

In all the figures of the present document, the identical elements and steps are designated by one and the same reference.

The general principle of the technique described relies on the use of a magnetic stripe reader comprising at least one first sensor and one second sensor respectively delivering a first temporal signal and a second temporal signal that are proportional to the flux of the magnetic field of the magnetic stripe passing in front of the sensors in question during the reading of the stripe by the reader. Besides, the first and second sensors are disposed at a pre-determined distance d from each other in a sense of travel of the stripe during the reading of the stripe by the reader.

Thus, the speed of travel of the stripe can be determined by applying the techniques described here below whatever the kinematics of the stripe in question when it is being read (for example when the stripe changes its sense of travel during the reading or in the presence of stops and restarts of travel, or even in the event of travel at a very low speed, etc.). The data (for example check characters) recorded on the stripe in question can thus be determined in an improved manner whatever the kinematics of the stripe during its reading.

We shall strive more particularly here below in the invention to describe a set of problems and issues existing in the field of electronic payment terminals and more particularly in the field of the reading of magnetic stripes implemented in payment cards faced by the inventors of the present patent application. The invention is of course not limited to this particular field of application but is of interest for the reading of magnetic stripes implemented on any type of object.

Figure 1:
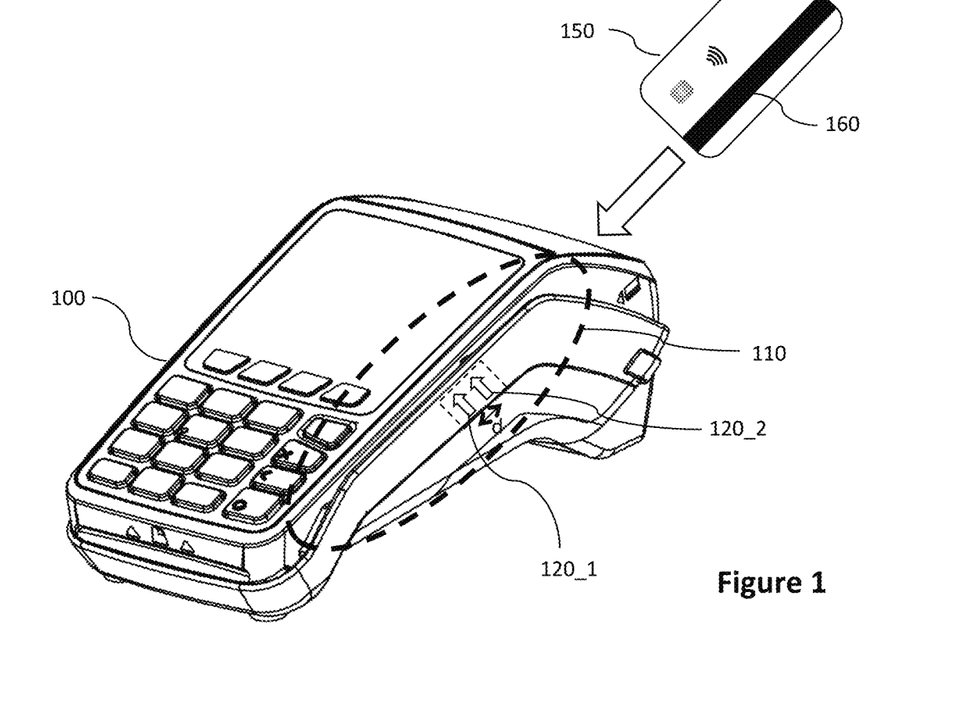
FIG. 1 illustrates a magnetic stripe reader embedded in an electronic payment terminal according to one embodiment of the invention.
Figure 4A:
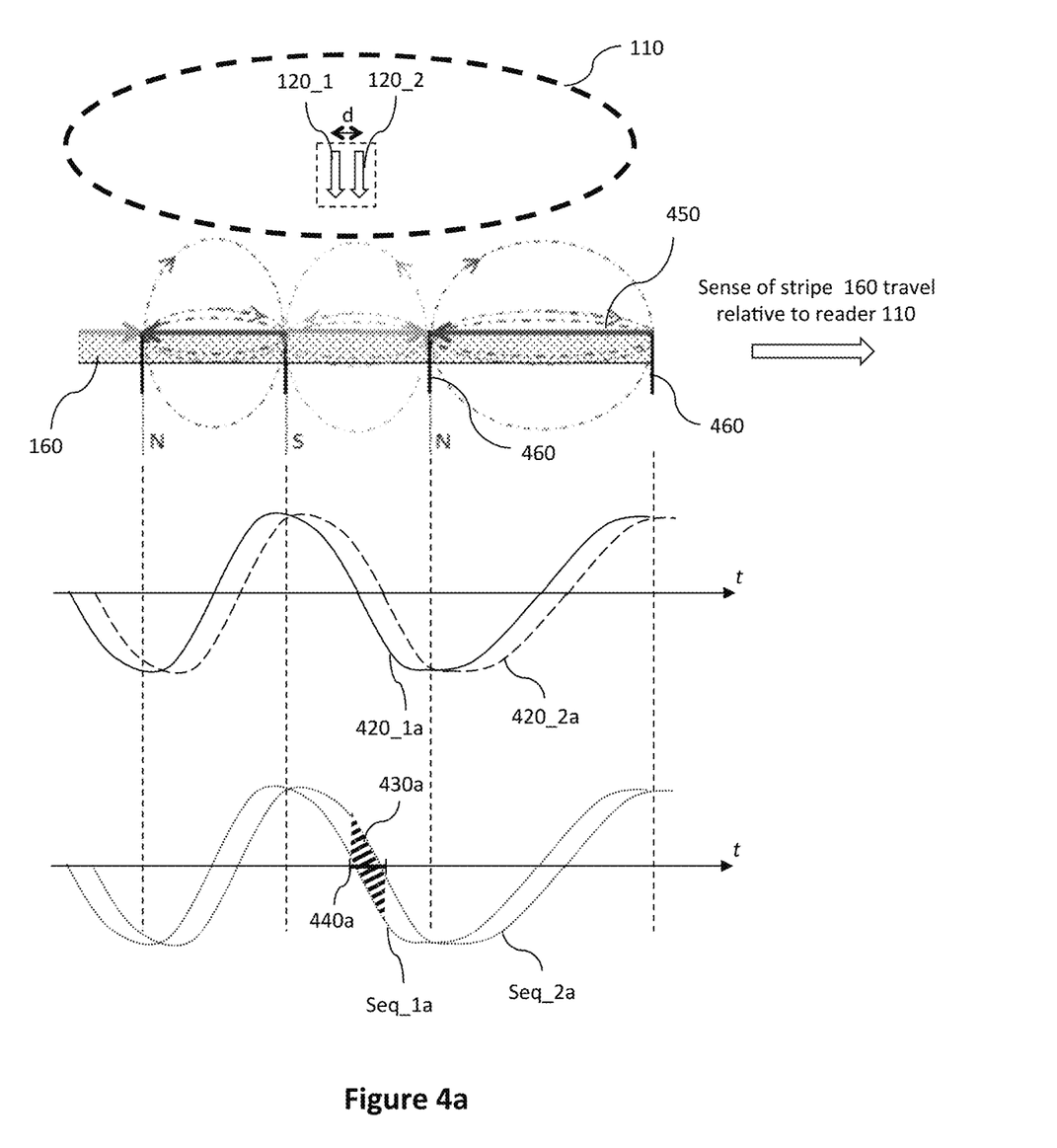
FIGS. 4a and 4b illustrate signals delivered by the first and second sensors of the reader of FIG. 1, as well as quantities associated with the application of the methods of FIGS. 2 and 3 during the reading of the magnetic stripe by the reader in question according to different embodiments of the invention.
Figure 4B:
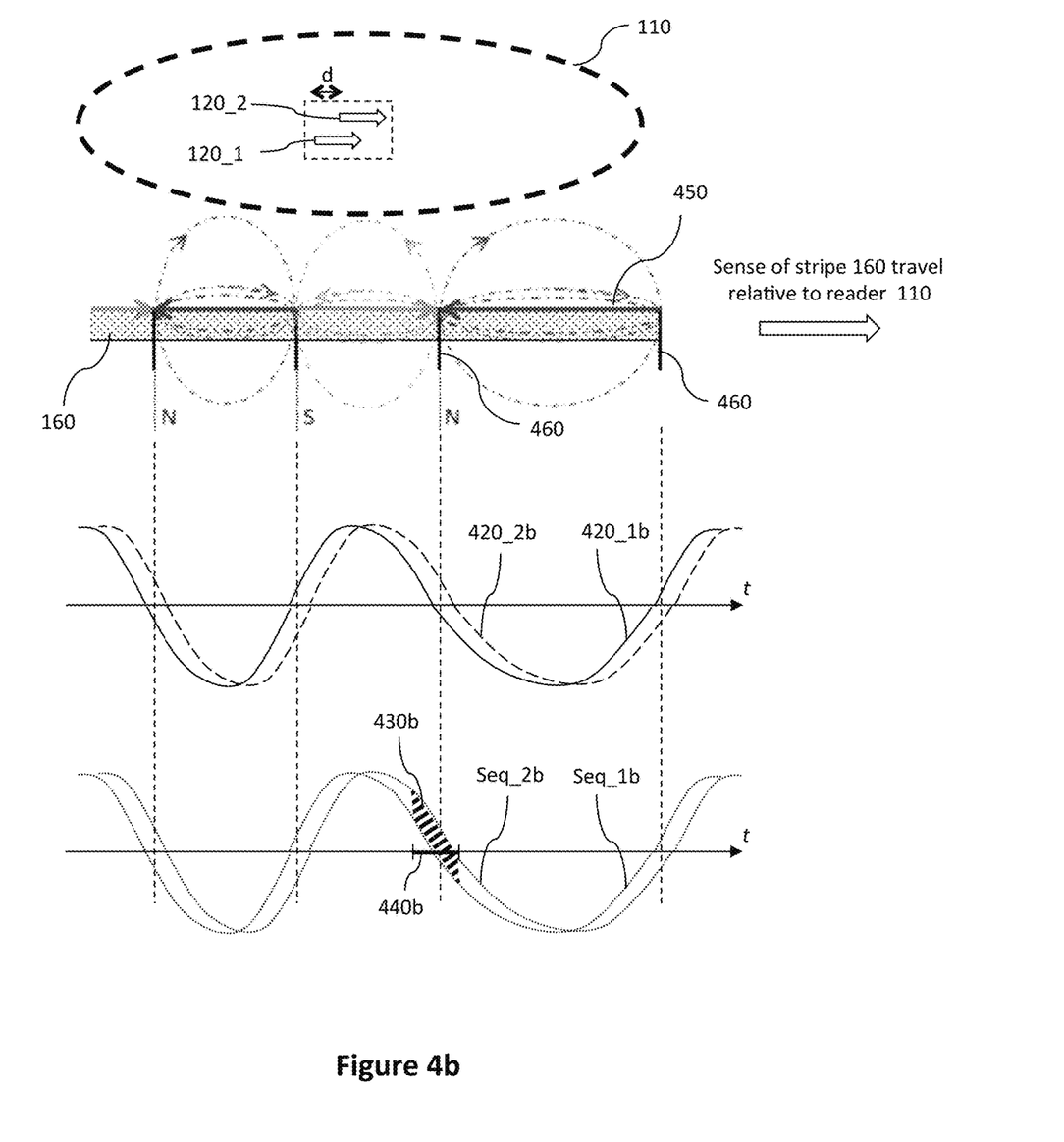

Referring now to FIG. 1, a description is given of a reader 110 of a magnetic stripe 160 embedded in an electronic payment terminal 100 according to one embodiment of the invention. FIGS. 4a and 4b illustrate two different configurations of the first sensor 120_1 and second sensor 120_2 of the reader 110 in relation to the sense of travel or the stripe 160.

In the embodiment illustrated in FIG. 1, the reader 110 is more particularly intended for reading the magnetic stripe 160 present on a payment card 150. Data (for example check characters) are recorded on the magnetic stripe 160. Such data enable for example a terminal 100 to identify the card 150 in order to conclude a transaction with a merchant.

In other embodiments not shown, the magnetic stripe is a stripe present on a transport ticket (for example bus ticket, underground rail ticket etc.) and the electronic terminal in question is a control device present in a corresponding transport means.

Returning to FIG. 1 and with reference to FIGS. 4a and 4b, the reader 110 comprises a first sensor 120_1 and a second sensor 120_2 respectively delivering the first temporal signal 420_1a, 420_1b and a second temporal signal 420_2a, 420_2b proportional to the flux of the magnetic field of the stripe 160 that passes through the sensitive surface of the first sensor 120_1 and second sensor 120_2 in question when the stripe 160 travels before them when it is being read by the reader 110. In variants, the first sensor 120_1 and the second sensor 120_2 are TMR or GMR sensors.

Besides, the first sensor 120_1 and second sensor 120_2 are disposed at a pre-determined distance d from one another in a sense of travel of the stripe 160 when it is being read by the reader 110.

Thus, knowledge of the pre-determined distance d makes it possible to determine the instantaneous speed of travel of the stripe 160 when it is being read by the terminal 100 via an appropriate processing of the first temporal signal 420_1a, 420_1b and second temporal signal 420_2a, 420_2b delivered by the first sensor 120_1 and second sensor 120_2 in question as described with reference to FIG. 2.

Besides, using the first sensor 120_1 and second sensor 120_2 that are sensitive to the flux of the magnetic field passing through them instead of using a sensor sensitive to the derivative of the flux in question, as is the case in prior-art readers, gives temporal signals 420_1a, 420_1b, 420_2a, 420_2b having good characteristics (for example in terms of amplitude) for their processing whatever the kinematics of the stripe 160 during the reading (for example when the stripe changes its sense of travel during the reading or in the presence of stops and re-starts of travel or even in case of travel at very low speed etc.).

Thus, the data recorded on the stripe 160 can be recognized in an improved way whatever the kinematics of the stripe 160 when it is being read, from the instantaneous speed of travel of the stripe 160 as described here below with reference to FIG. 3.

In variants, the first sensor 120_1 and the second sensor 120_2 are integrated into one and the same silicon chip.

Thus, the dispersions between the characteristics (static or deviant, for example in terms of temperature) of the first sensor 120_1 and the second sensor 120_2 in question are minimized (for example their levels of sensitivity to the magnetic field). It is thus possible to do away with the phases of calibration of the sensors and of compensating for the dispersions in question, thereby reducing the cost of the overall solution. Similarly, in the variants in question, the pre-determined distance d between the sensors is particularly well controlled.

According to different configurations, the sensitive surface of the first sensor 120_1 and the second sensor 120_2 is disposed according to different orientations relative to the sense of travel of the stripe 160 when it is being read. For example:

in a first configuration of the reader 110 (illustrated in FIG. 4a), the direction of sensitivity (represented by the arrows symbolizing the sensors) of the first sensor 120_1 and the second sensor 120_2 is such that they react to the component of the magnetic field that is perpendicular to the magnetic stripe 160 when it is being read by the reader 110; and in a second configuration of the reader 110 (illustrated in FIG. 4b), the direction of sensitivity of the first sensor 120_1 and the second sensor 120_2 is such that these sensors react to the component of the magnetic field that is coplanar with the magnetic stripe 160 when it is being read by the reader 110.

Such configurations have an impact on the waveform of the temporal signals 420_1a, 420_1b, 420_2a, 420_2b, and therefore on the criteria of decision to be applied in order to recognize the data recorded on the stripe 160 as described here below with reference to FIG. 3.

Figure 2:
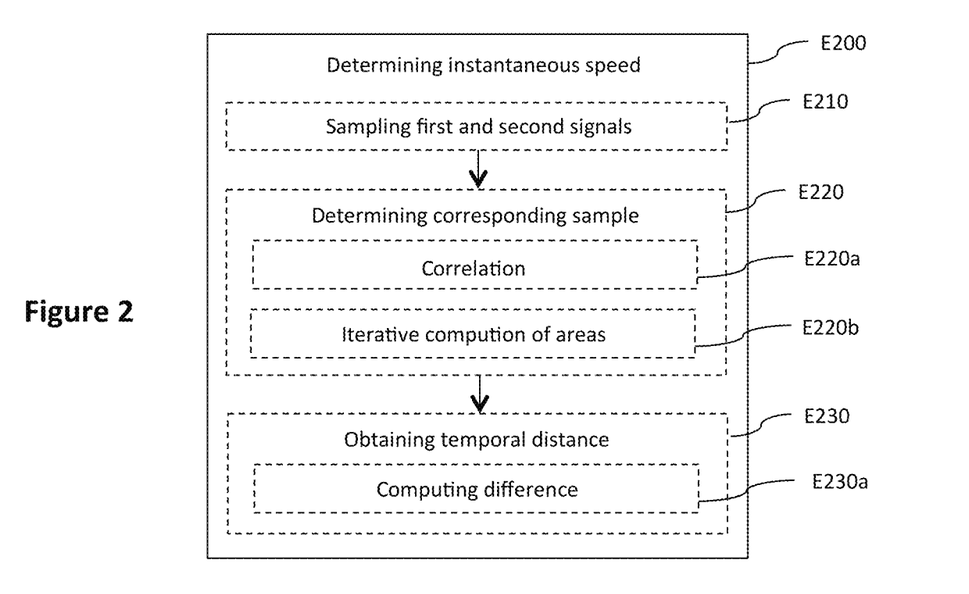
FIG. 2 illustrates steps of a method for determining the instantaneous speed of travel of a magnetic stripe read by the reader of FIG. 1, according to different embodiments of the invention.

Referring now to FIG. 2, we describe the steps of a method for determining the instantaneous speed of travel of the magnetic stripe 160 when it is read by the reader 110 of FIG. 1, according to different embodiments of the invention. Such steps are besides illustrated through the signals represented in FIGS. 4a and 4b.

Such a method comprises a step E200 for determining the instantaneous speed of travel of the magnetic stripe 160 from the first temporal signals 420_1a, 420_1b and second temporal signals 420_2a, 420_2b delivered by the first sensor 120_1 and second sensor 120_2, and the pre-determined distance d between the first sensor 120_1 and second sensor 120_2 in question.

More particularly, the step E200 for determining comprises a sampling sub-step E210 for sampling the first temporal signals 420_1a, 420_1b and second temporal signals 420_2a, 420_2b respectively delivering the first temporal sequences of samples Seq_1a, Seq_1b and second temporal sequences of samples Seq_2a, Seq_2b. As a result, the processing operations applied subsequently are carried out in a precise manner in the digital domain.

Besides, the step E200 for determining comprises the following sub-step for at least one sample of the first temporal sequence of samples, called a current sample:

determining E220 a corresponding sample of the second temporal sequence of samples, maximizing a pre-determined criterion of correspondence with the current sample; and obtaining E230 a temporal distance between the current sample and the corresponding sample;

More particularly, in a first embodiment of the method for determining the instantaneous speed, the sub-step E220 for determining comprises a correlation E220a between the first temporal sequences of samples Seq_1a, Seq_1b and the second temporal sequences of samples Seq_2a, Seq_2b, delivering a correlation function. Thus, a maximum value of the correlation function in question represents a correspondence between the first temporal sequences of samples Seq_1a, Seq_1b and the second temporal sequences of samples Seq_2a, Seq_2b. The temporal index of the corresponding sample is thus a function of the index of the maximum in question (for example the temporal index of the corresponding sample is equal to the temporal index of the current sample to which we add the index of the maximum of the correlation function).

Besides, the sign of the difference between the temporal indices of the current sample and of the corresponding sample represents a sense of travel of the stripe 160 relative to the reader 110 at the time of capture of the current sample by the first sensor 120_1. Indeed, given that this spatial disposition of the first sensor 120_1 and second sensor 120_2 is known, the indication according to which a piece of data recorded on the stripe 160 has passed first of all before one of the two sensors 120_1 (or 120_2) and then only afterwards before the other of the two sensors 120_2 (or 120_1) makes it possible to know the sense in which the stripe 160 is moving during the reading operation.

In a second embodiment of the method for determining the instantaneous speed, the sub-step E220 for determining comprises an iterative computation E220b of a plurality of areas 430a, 430b as a function of a difference between:
- a first sum, on a time slot 440a, 440b comprising the current sample, first samples of the first temporal sequence of samples Seq_1a, Seq_1b; and
- a second sum, on the time slot 440a, 440b, of second samples of the second temporal sequence of samples Seq_2a, Seq_2b offset by a variable temporal offset updated at each iteration of the computation in question.

Indeed, such first and second sums are proportional respectively to a first area and a second area present on the one hand under the curve representing the first temporal sequences of samples Seq_1a, Seq_1b and secondly under the curve representing the second temporal sequences of samples Seq_2a, Seq_2b but offset by the temporal offset in question.

A temporal offset value corresponding to a minimum of the difference between the first and second areas thus represents a correspondence between the first temporal sequences of samples Seq_1a, Seq_1b and second temporal sequences Seq_2a, Seq_2b of samples. Indeed, such a minimum corresponds to the fact that the first temporal sequences of samples Seq_1a, Seq_1b and second temporal sequences of samples Seq_2a, Seq_2b have been resynchronized via the application of the temporal offset in question. The temporal index of the corresponding sample is thus deduced from the value of the temporal offset in question.

Besides, when the temporal offset applied is zero, the sign of the difference between the first and second areas (and therefore of the difference between the first and second sums) represents a sense of travel of the stripe 160 relative to the reader 110 at the time of capture of the current sample by the first sensor 120_1. Indeed, such a sign makes it possible to know which is the sensor, of the two sensors 120_1 or 120_2, before which the current sample has passed first during the reading of the stripe 160.

In the two embodiments mentioned here above, the sub-step E230 for obtaining the temporal distance comprises a computation of a difference E230a between the temporal indices of the current sample and of the corresponding sample, delivering the temporal distance between the current sample and the corresponding sample.

Thus, the instantaneous speed of travel is determined as a function, on the one hand, of the temporal distance between the current sample and the corresponding sample and, on the other hand, the predetermined distance d. For example, the instantaneous speed is determined as being equal to the predetermined distance d divided by the temporal distance obtained during the implementing of the sub-step for obtaining E230.

The instantaneous speed thus determined is also associated with the current sample and the corresponding sample.

Thus, the nature of the signals delivered by the sensors of the reader (sensors sensitive to the flux of the magnetic field passing through them) makes it possible to implement processing operations leading to the determining of the instantaneous speed in question in an improved way, i.e. whatever the kinematics of the stripe during its reading.

Such an instantaneous speed determined in an improved way makes it possible for example to implement an improved recognition of data recorded on the stripe 160 as described here below with reference to FIG. 3.

Figure 3:
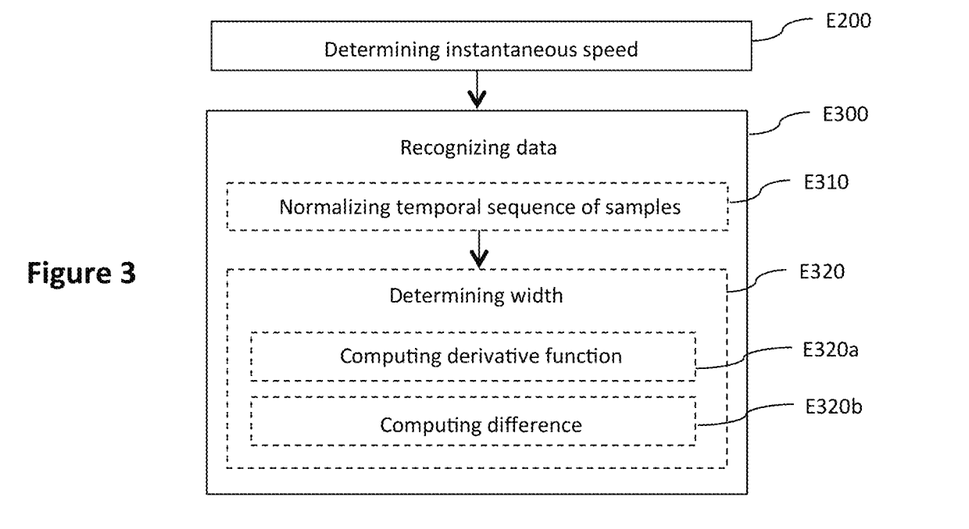
FIG. 3 illustrates steps of a method for recognizing at least one piece of data recorded on the magnetic stripe read by the reader of FIG. 1 according to different embodiments of the invention.

Referring now to FIG. 3, we describe the steps of a method for recognizing at least one piece of data recorded on the magnetic stripe 160 read by the reader 110 of FIG. 1 according to different embodiments of the invention. Such steps are furthermore illustrated via the signals represented in FIGS. 4a and 4b.

Such a method comprises the following steps:
determining E100 the instantaneous speed of travel of the stripe 160 by implementing the method for determining instantaneous speed described here above with reference to FIG. 2 (according to any one of its embodiments); and
recognizing E300 the at least one piece of data from, on the one hand, the instantaneous speed of travel and from, on the other hand, at least one of the first temporal sequences of samples Seq_1a, Seq_1b and second temporal sequences of samples Seq_2a, Seq_2b.

Thus, such a method of recognition takes advantage of the improved determining of the instantaneous speed of travel of the stripe through the processing operations applied to the signals delivered by the first sensor 120_1 and second sensor 120_2 of the reader 110 (sensors sensitive to the flux of the magnetic field passing through them). The at least one piece of data is thus recognized whatever the kinematics of the stripe 160 when it is being read.

For example, the step E300 for recognizing comprises a sub-step E310 for normalizing at least one sequence of the first temporal sequences of samples Seq_1a, Seq_1b and second temporal sequences of samples Seq_2a, Seq_2b on the basis of the speeds associated with the samples of the sequences in question. Such a normalization delivers at least one sequence of virtual samples representing a spatial disposition of magnetic elements representing the at least one piece of data recorded on the stripe.

In other words, the normalization in question makes it possible to set up the correspondence between the temporal waveform of the first temporal sequences 420_1a, 420_1b and second temporal sequences 420_2a, 420_2b (a waveform that is distorted by the motions related to the kinematics of passage of the stripe 160 in the reader 110) and the physical disposition of the magnetic elements that represent the data on the magnetic stripe 160. Such a correspondence is possible through knowledge of the instantaneous speed of travel of the stripe 160, determined during the implementing of the step E200 for determining the instantaneous speed. The instantaneous speed of travel makes it possible indeed to make a trace back to the physical position of a magnetic element on the stripe 160 from the point in time at which the flux of the corresponding magnetic field had been picked up by the first sensor 120_1 and/or the second sensor 120_2.

Thus, the at least one piece of data is recognized from the at least one sequence of virtual samples delivered by the normalization sub-step E310.

More particularly, the first temporal sequences of samples Seq_1a, Seq_1b and second temporal sequences of samples Seq_2a, Seq_2b contain in principle the same information but offset in time. Thus, the recognition of the at least one piece of data can be done on the basis of a sequence of virtual samples obtained from either the first temporal sequences of samples Seq_1a, Seq_1b or the second temporal sequences of samples Seq_2a, Seq_2b.

However, in certain embodiments, it can be advantageous to use two virtual sequences of samples obtained respectively from the first temporal sequences of samples Seq_1a, Seq_1b and the second temporal sequences of samples Seq_2a, Seq_2b.

For example, in certain embodiments, the magnetic elements representing the at least one piece of data correspond to a plurality of magnetic strips 450 disposed in a sense crosswise to the sense of travel of the stripe 160 during the reading. More particularly, the magnetic strips 450 succeed one another along the stripe 160 with magnetic polarities alternating from one strip 450 to the next one (i.e. the poles are inverted from one strip 450 to the next one). The at least one piece of data is represented through a width of at least one corresponding magnetic strip 450 (for example the at least one piece of data is encoded according to an encoding known as "F2F" or "Aiken Biphase" encoding as defined in the ISO/IEC-7811 standard).

In the embodiments in question, the step of recognition E300 includes a determining E320 of the at least one width so as to recognize the at least one piece of data.

For example, the step for determining E320 the at least one width implements a method of estimation of boundaries 460 of the at least one magnetic strip 450.

More particularly, in a first embodiment of the method of recognition, the step of normalization E310 is applied either to the first temporal sequence of samples or to the second temporal sequence of samples and delivers a corresponding sequence of virtual samples. The method of estimation of boundaries 460 implements a computation E320a of a derivative function of the sequence of virtual samples in question.

For example, in the configuration where the direction of sensitivity of the first sensor 120_1 and second sensor 120_2 is such that they react to the component of the magnetic field that is perpendicular to the magnetic stripe 160 during its reading by the reader 110 (first above-mentioned configuration of the reader 110 illustrated in FIG. 4a), the boundaries 460 then correspond to zeros of the derivative function in question.

In the configuration where the direction of sensitivity of the first sensor 120_1 and second sensor 120_2 is such that they react to the component of the magnetic field that is coplanar with the magnetic stripe 160 during its reading by the reader 110 (second above-mentioned configuration of the reader 110 illustrated in FIG. 4b), the boundaries 460 then correspond to extreme values of the derivative function in question.

In a second embodiment of the method of recognition, the step of normalization E310 is also applied there either to the first temporal sequence of samples or to the second temporal sequence of samples, and delivers a corresponding sequence of virtual samples.

However, in the configuration where the direction of sensitivity of the first sensor 120_1 and second sensor 120_2 is such that they react to the component of the magnetic field that is perpendicular to the magnetic stripe 160 during its reading by the reader 110 (first above-mentioned configuration of the reader 110 illustrated in FIG. 4a), the boundaries 460 estimated at the determining step E320 correspond to extreme values (maximum or minimum) of the sequence of virtual samples in question.

In the configuration where the direction of sensitivity of the first sensor 120_1 and second sensor 120_2 is such that they react to the component of the magnetic field that is coplanar with the magnetic stripe 160 when it is being read by the reader 110 (second above-mentioned configuration of the reader 110 illustrated in FIG. 4b), the boundaries 460 estimated at the step for determining E320 correspond to passages through zero of the sequence of virtual samples in question.

In a third embodiment of the method of recognition, the step of normalization E310 is applied both to the first temporal sequence of samples and to the second temporal sequence of samples so as to deliver first and second corresponding sequences of virtual samples. The method for estimating boundaries 460 implements a computation E320b of a difference between the first and second sequences of virtual samples.

In the configuration where the direction of sensitivity of the first sensor 120_1 and second sensor 120_2 is such that they react to the component of the magnetic field that is perpendicular to the magnetic stripe 160 during its reading by the reader 110 (first above-mentioned configuration of the reader 110 illustrated in FIG. 4a), the boundaries 460 then correspond to zeros of the difference in question.

In the configuration where the direction of sensitivity of the first sensor 120_1 and second sensor 120_2 is such that they react to the component of the magnetic field that is coplanar with the magnetic stripe 160 during its reading by the reader 110 (second above-mentioned configuration of the reader 110 illustrated in FIG. 4b), the boundaries 460 then correspond to extrema of the difference in question According to the different embodiments, the proposed solution therefore enables the recognition of at least one piece of data recorded on a magnetic stripe read by a magnetic reader as described here above.

Figure 5:
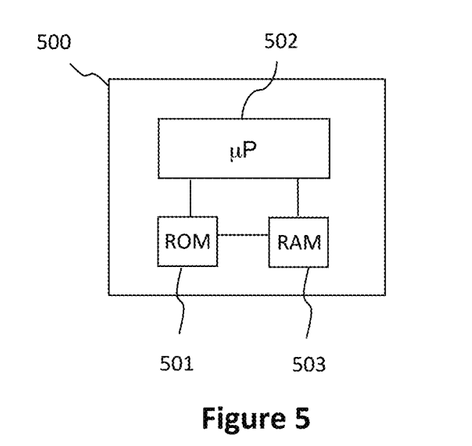
FIG. 5 presents a simplified example of a structure of a device intended to implement the device for determining the instantaneous speed of travel of FIG. 2.

FIG. 5 presents an example of a structure of a device 500 for determining the instantaneous speed of travel of the magnetic stripe 160 when it is read by the reader 110 (according to any one of its embodiments mentioned here above).

More particularly, such a device 500 enables the implementation of the method for determining the instantaneous speed of the FIG. 2 in any one of the different embodiments. The device 500 comprises a volatile memory 503 (for example a RAM), a processing unit 502 equipped for example with a processor and driven by a computer program stored in a non-volatile memory 501 (for example a ROM or a hard disk drive). At initialization, the code instructions of the computer program are for example loaded into the volatile memory 503 and then executed by the processor of the processing unit 502.

This FIG. 5 illustrates only one particular way, among several possible ways, of obtaining the means included in the device 500 so that it carries out certain steps of the method for determining the instantaneous speed described in detail here above, with reference to FIG. 2 (in any one of the different embodiments). Indeed, these steps can be carried out equally well on a reprogrammable computation machine (or a PC, a DSP or a microcontroller) executing a program comprising a sequence of instructions or on a dedicated computation machine (for example a set of logic gates such as an FPGA or an ASIC or any other hardware module). Should the means included in the device 500 be made with a reprogrammable computing machine, the corresponding program (i.e. the sequence of instructions) could be stored in a storage medium that is detachable (for example a floppy disk, a CD-ROM or a DVD-ROM) or not detachable, this storage medium being partially or totally readable by a computer or a processor.

Figure 6:
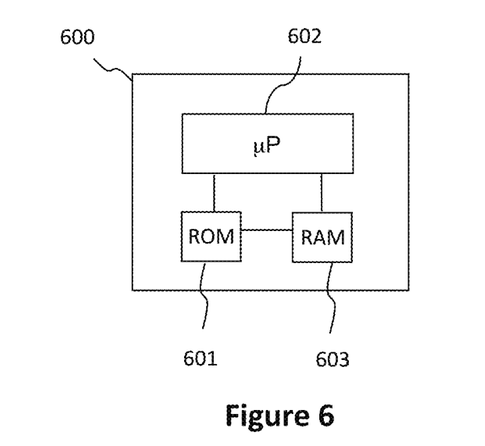
FIG. 6 presents a simplified example of a structure of a device intended to implement the method for recognizing at least one piece of data of FIG. 3.

FIG. 6 presents an example of a structure of a device 600 for the recognition of at least one piece of data recorded on a magnetic stripe 160 when it is read by the reader 110 (according to any one of its above-mentioned embodiments).

More particularly, such a device 600 enables the implementing of the method of recognition of at least one piece of data of FIG. 3, in any one of the different embodiments. The device 600 comprises a volatile memory 603 (for example a RAM), a processing unit 602 equipped for example with a processor and driven by a computer program stored in a non-volatile memory 601 (for example a ROM or a hard disk drive). At initialization, the code instructions of the computer program are for example loaded into the volatile memory 603 and then executed by the processor of the processing unit 602.

This FIG. 6 illustrates only one particular way, among several possible ways of obtaining the means included in the device 600 so that they can carry out certain steps of the method for recognizing at least one piece of data described in detail here above with reference to FIG. 3 (in any one of its different embodiments). Indeed, these steps can be carried out equally well on a reprogrammable computation machine (or a PC, a DSP or a microcontroller) executing a program comprising a sequence of instructions or on a dedicated computation machine (for example a set of logic gates such as an FPGA or an ASIC or any other hardware module). Should the means included in the device 600 be made with by a reprogrammable computing machine, the corresponding program (i.e. the sequence of instructions) could be stored in a storage medium that is detachable (for example a floppy disk, a CD-ROM or a DVD-ROM) or not detachable, this storage medium being partially or totally readable by a computer or a processor.

It can thus be seen that the device 600 comprises the means of the device 500, the method of recognition of at least one piece of data of FIG. 3 comprising the steps of the method of FIG. 2 for determining the instantaneous speed.

Thus, in certain embodiments, the terminal 100 comprises either only the device 600 or only the device 500 (for example when another pre-existing device of the terminal 100 implements a known method of recognition of data on the basis of the instantaneous speed of travel that is given to them by the device 500). In other embodiments, the terminal 100 comprises both the device 600 and the device 500 in order, for example, to be able to implement different methods (prior art or according to the invention) for recognition of data on the basis of the instantaneous speed of travel given by the device 500.

The invention claimed is:

1. A magnetic stripe reader comprising:
at least one first sensor and at least one second sensor respectively delivering a first temporal signal and a second temporal signal proportional to a flux of a magnetic field of a magnetic stripe traveling before said first and second sensors during the reading of the stripe by the reader,
said first and second sensors being disposed at a pre-determined distance from each other in a sense of travel of the stripe during said reading, wherein the first and second sensors belong to the group consisting of:
a TMR (Tunneling Magnetic Resistance) sensor; and
a GMR (Giant Magnetic Resistance) sensor.

2. The magnetic stripe reader according to claim 1, wherein the first and second sensors are integrated into one and the same silicon chip.

3. A method comprising:
determining instantaneous speed of travel of a magnetic stripe read by a magnetic stripe reader, comprising:
reading the magnetic stripe by the magnetic stripe reader, which comprises:
at least one first sensor and at least one second sensor respectively delivering a first temporal signal and a second temporal signal proportional to a flux of a magnetic field of the magnetic stripe traveling before said first and second sensors during the reading of the stripe by the reader,
said first and second sensors being disposed at a pre-determined distance from each other in a sense of travel of the stripe during said reading;
determining an instantaneous speed of travel of said magnetic stripe from said first and second temporal signals and from said pre-determined distance between said first and second sensors.

4. The method according to claim 3,
wherein said determining the instantaneous speed of travel comprises:
sampling said first and second temporal signals respectively delivering first and second temporal sequences of samples and, for at least one sample of said first temporal sequence of samples, called a current sample:
determining a corresponding sample of said second temporal sequence of samples, maximizing a pre-determined criterion of correspondence with said current sample; and
obtaining a temporal distance between the current sample and the corresponding sample,
said instantaneous speed of travel being determined as a function of said temporal distance between the current sample and said corresponding sample and of said pre-determined distance,
said instantaneous speed of travel being associated with said current sample and with said corresponding sample.

5. The method according to claim 4 wherein said determining said corresponding sample comprises a correlation between said first and second temporal sequences of samples, delivering a correlation function,
a temporal index of the corresponding sample being a function of an index of a maximum of said correlation function,
and wherein said obtaining said temporal distance comprises computing a difference between the temporal indices of the current sample and of said corresponding sample.

6. The method according to claim 4 wherein said determining said corresponding sample comprises an iterative computation of a plurality of areas as a function of a difference between:
a first sum on a temporal window comprising said current sample, of first samples of said first temporal sequence of samples; and
a second sum, on said temporal window, of second samples of said second temporal sequence of samples offset by a variable temporal offset updated at each iteration of the computation,
a temporal index of said corresponding sample being a function of a value of said temporal offset corresponding to a minimum area among said plurality of areas,
and wherein said obtaining said temporal distance comprises a computation of a difference between the temporal indices of said current sample and of said corresponding sample.

7. The method according to claim 4, further comprising:
recognizing at least one piece of data recorded on the magnetic stripe from said instantaneous speed of travel and from at least one of said first and second temporal sequences of samples.

8. The method according to claim 7 wherein said recognizing comprises a normalization of at least one of said first and second temporal sequences of samples from speeds associated with the samples of said sequences, said normalization delivering at least one sequence of virtual samples representing a spatial disposition of magnetic elements representing said at least one piece of data on the stripe, said at least one piece of data being recognized from said at least one sequence of virtual samples.

9. The method according to claim 8 wherein said magnetic elements correspond to a plurality of magnetic strips disposed in a sense crosswise to the sense of travel of the stripe during the reading, said magnetic strips succeeding one another along the stripe with magnetic polarities alternating from one strip to the next, said at least one piece of data being represented via a width of at least one corresponding magnetic strip, said recognizing comprising determining said at least one width, said at least one piece of data being recognized from said at least one width.

10. The method according to claim 9 wherein said determining said at least one width implements a method for estimating boundaries of said at least one corresponding magnetic strip, belonging to the group consisting of:

computing a derivative function of said at said least one sequence of virtual samples, said boundaries corresponding to zeros or to extrema of said derivative function; and computing a difference between said first and second sequences of virtual samples, said boundaries corresponding to zeros or to extrema of said difference, when said normalization applied to said first and second temporal sequences of samples delivers first and second corresponding sequences of virtual samples.

11. A non-transitory computer-readable medium comprising program code instructions stored thereon for implementing a method of determining instantaneous speed of travel of a magnetic stripe read by a magnetic stripe reader, when said program is executed by a processor of the magnetic stripe reader, wherein the instructions configure the magnetic stripe reader to perform acts comprising:

reading the magnetic stripe by the magnetic stripe reader, which comprises:

at least one first sensor and at least one second sensor respectively delivering a first temporal signal and a second temporal signal proportional to a flux of a magnetic field of the magnetic stripe traveling before said first and second sensors during the reading of the stripe by the reader, said first and second sensors being disposed at a pre-determined distance from each other in a sense of travel of the stripe during said reading; and determining an instantaneous speed of travel of said magnetic stripe from said first and second temporal signals and from said pre-determined distance between said first and second sensors.

12. A device for determining instantaneous speed of travel of a magnetic stripe read by a magnetic stripe reader, which includes at least one first sensor and at least one second sensor respectively delivering a first temporal signal and a second temporal signal proportional to a flux of a magnetic field of the magnetic stripe traveling before said first and second sensors during reading of the stripe by the reader device, said first and second sensors being disposed at a pre-determined distance from each other in a sense of travel of the stripe during said reading, wherein the device comprises:

a reprogrammable computation machine or a dedicated computation machine configured to:

receive the first and second temporal signals; and determine the instantaneous speed of travel of said magnetic stripe from said first and second temporal signals and from said pre-determined distance between said first and second sensors.

13. The device according to claim 12, wherein the reprogrammable computation machine or the dedicated computation machine is further configured to:

sample said first and second temporal signals respectively delivering first and second temporal sequences of samples and, for at least one sample of said first temporal sequence of samples, called a current sample:

determine a corresponding sample of said second temporal sequence of samples, maximizing a pre-determined criterion of correspondence with said current sample; and obtain a temporal distance between the current sample and the corresponding sample, determine the instantaneous speed of travel of said magnetic stripe as a function of said temporal distance between the current sample and said corresponding sample and of said pre-determined distance, said instantaneous speed of travel being associated with said current sample and with said corresponding sample; and recognize said at least one piece of data from said instantaneous speed of travel and from at least one of said first and second temporal sequences of samples.

14. An electronic payment terminal comprising the device according to claim 12.

* * * * *